Oct. 21, 1969     KIYOSHI INOUE     3,474,013
METHOD OF AND APPARATUS FOR THE ELECTROCHEMICAL MACHINING
OF A CONDUCTIVE WORKPIECE
Filed June 30, 1966     4 Sheets-Sheet 1
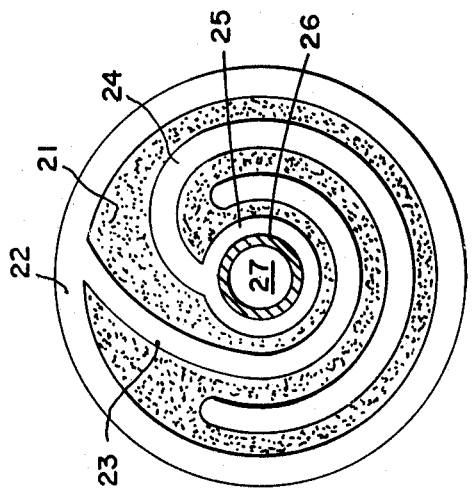
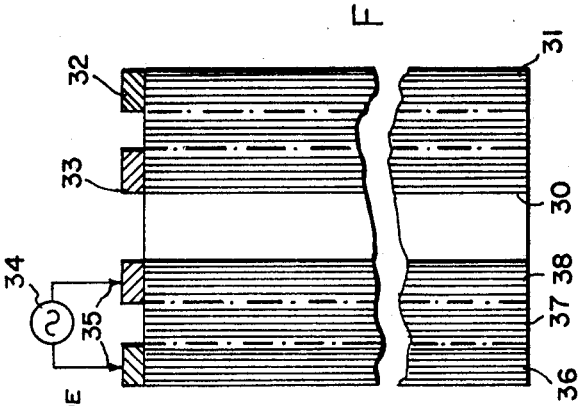
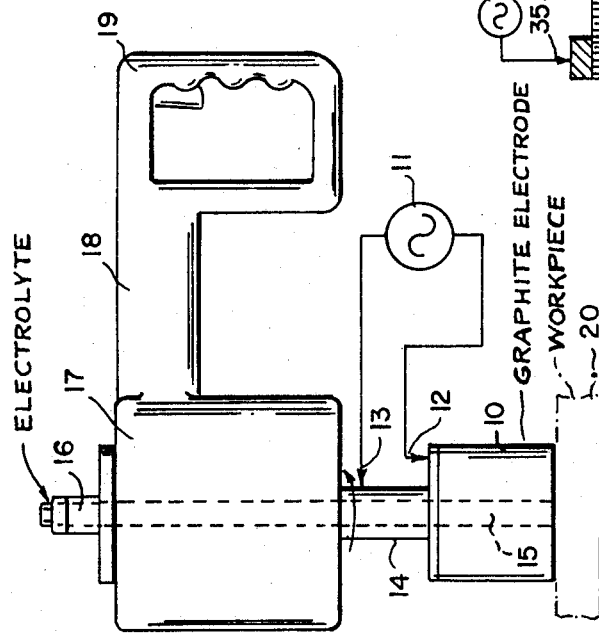
KIYOSHI INOUE
*INVENTOR.*
BY
*Karl F. Ross
Attorney*

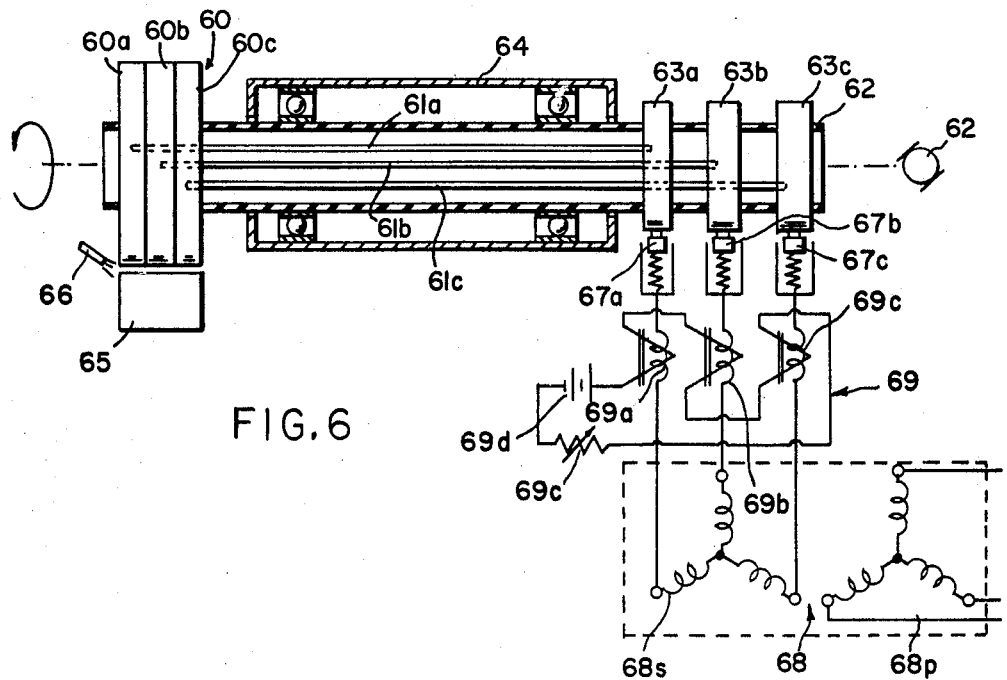
FIG. 6
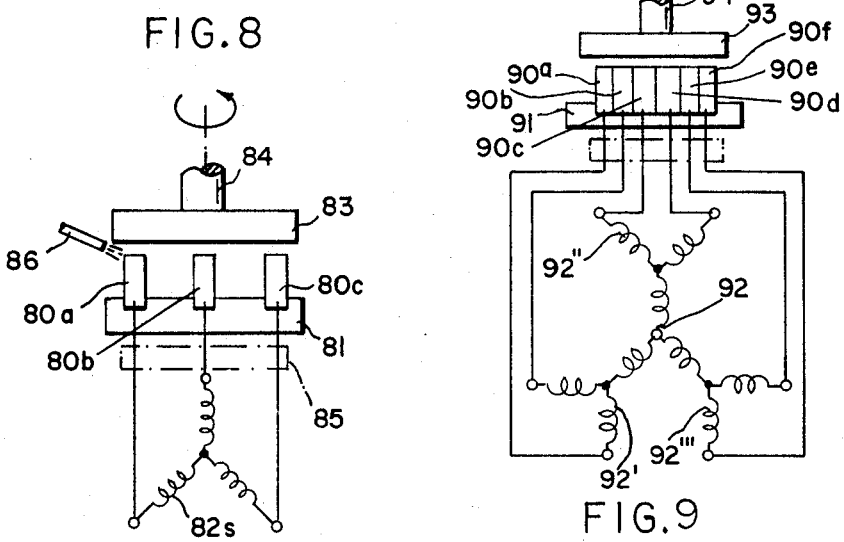
FIG. 8
FIG. 9
KIYOSHI INOUE
INVENTOR.
BY

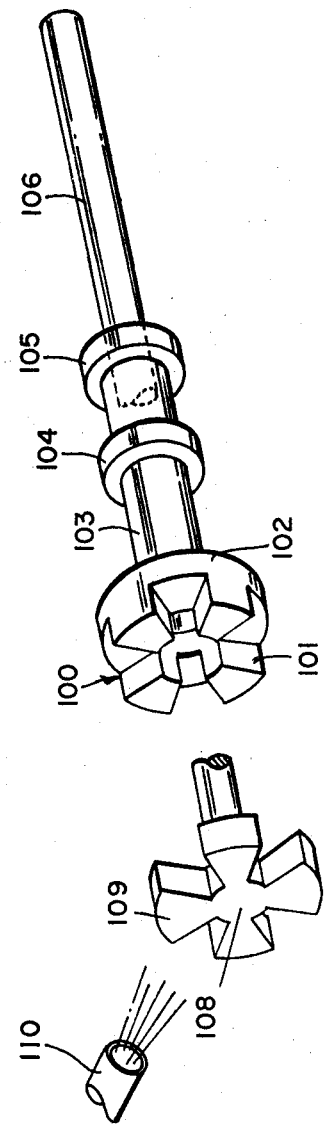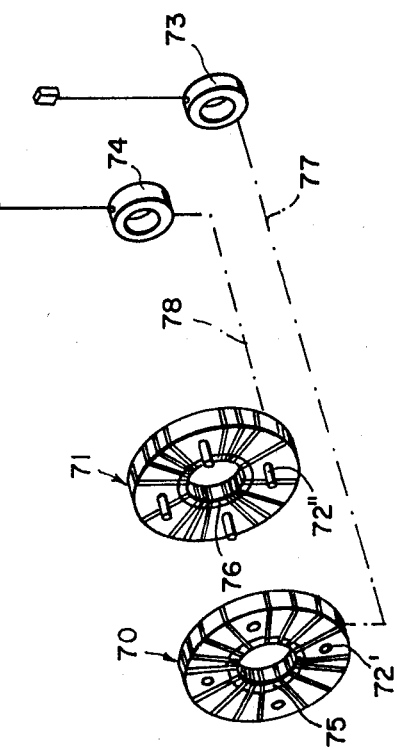

United States Patent Office 3,474,013
Patented Oct. 21, 1969

3,474,013
METHOD OF AND APPARATUS FOR THE ELECTROCHEMICAL MACHINING OF A CONDUCTIVE WORKPIECE
Kiyoshi Inoue, 100 Sakato, Kawasaki,
Kanagawa, Tokyo, Japan
Filed June 30, 1966, Ser. No. 565,670
Claims priority, application Japan, July 17, 1965,
40/43,120; Dec. 10, 1965, 40/75,995
Int. Cl. B23p 1/12
U.S. Cl. 204—143
11 Claims

ABSTRACT OF THE DISCLOSURE

In the electrochemical machining of a workpiece, the electrode is constituted by a unitary graphite body with grain planes transverse to the machining surface such that the electrical conductivity in the direction of the plane of the grain is greater than perpendicularly thereto. The grain planes define closely spaced electrode surfaces at the machining face with intervening insulating barriers composed of identical grain planes to which current is not supplied. The machining current is applied to the spaced-apart grain planes of the conductive surfaces and machining is carried out by the passage of current between these surfaces.

---

My present invention relates to a method of and an electrode for the electrochemical machining of a conductive workpiece and, more particularly, to improvements in techniques for the electrochemical erosion of conductive workpiece surfaces.

In my copending application Ser. No. 512,338, filed Dec. 8, 1965 and entitled "Method of and Apparatus for the Electrical Removal of Conductive Material," certain subject matter of which has been divided and now appears in application Ser. No. 562,857, since issued as U.S. Patent No. 3,420,759, I disclose and claim a system whereby electrochemical removal of conductive material can be carried out effectively without concern for the spacing between the electrode and the workpiece when the electrode is constituted of a material within the specific-resistivity range of substantially 0.001 and 10 ohm-cm. As the text of this disclosure observes, there have been heretofore many proposals for the electrochemical machining of a conductive workpiece and prior arrangements have included devices for the electrochemical sinking of cavities, the electrolytic honing, grinding or lapping of metallic workpieces and the like. In all of these prior-art systems, however, an electrode, usually of a conductive material such as silver, brass or copper, was spacedly juxtaposed with the workpiece surface to be machined and an electric source was connected across the electrode and the workpiece while the gap between them was supplied with a suitable electrolyte. It was found that such systems were highly sensitive to the width of the electrode/workpiece gap and that fluctuations in this gap width resulted in inefficient material-removal operations or in a poor finish and reproduction accuracy. Thus, it was necessary to provide servomechanisms or the like for controlling the electrode/workpiece gap or to utilize electrode systems which incorporated insulating spacer particles adapted to maintain this gap. Electrodes of the latter type were generally provided of a metal in which diamond particles were embedded to serve as dielectric spacers. This arrangement had the disadvantage that the metal-bonded diamond wheels were relatively expensive and thus could not be readily contoured or adapted to suit various possible applications. The use of servomechanisms, however, permitted less expensive wheels to be employed but involved a considerable expense with respect to instrumentation and apparatus costs. Furthermore, it was discovered that neither prior arrangement was entirely satisfactory unless relatively sophisticated means was provided to interrupt the arc discharges which normally developed between the electrode and the workpiece. Such means generally involved an arrangement for decreasing the potential applied across the electrode and the workpiece and thus led to a reduction in the machining efficiency. In all cases, moreover, it was necessary to mount the workpiece upon a holder or the like so that the workpiece could be immersed in the electrolyte and held at a predetermined distance from the electrode support or electrode surface. In the aforementioned earlier filed copending application, I have observed that most of these disadvantages can be obviated by the use of an electrode structure whose specific resistivity, at least in the region of the machining surface, is within the indicated range and the electrolyte employed as the machining medium has essentially a corresponding resistivity so that, when the electrode is urged toward the workpiece surface, it can contact and/or approach the latter from time to time without creating short circuits which interrupt the electrolytic process. Even at moments of contact between the electrode and the workpiece, therefore, machining continues at intervening locations through the pockets of electrolyte. Because of the corresponding specific resistivities of the surface region of the electrode and of the electrolyte within these pockets, the current flow between the regions of closest approach of the electrode to the workpiece and through these electrolyte pockets is proportional to the relative cross-sectional areas thereof and electrolytic machining by ion currents continues even if there is actual engagement of these regions of closest approach with the workpiece. Even this system, however, requires electrical connection of the workpiece with one terminal of the power source.

Thus it can be stated that there has hitherto been no truly effective method whereby machining of a workpiece by an electrolytic process can be carried out without the aid of relatively complex and bulky apparatus requiring the connection of the workpiece to the source. It may also be observed that, while others have proposed that the electrode structure itself may be made up of a plurality of electrode surfaces, it has not been possible heretofore to avoid the difficulties involved in mounting the workpiece in place in the apparatus.

It is, therefore, an important object of the present invention to provide a system for the electrochemical machining (e.g. grinding, honing, lapping, boring) of metallic workpieces and, more generally, for the electrochemical erosion of conductive bodies, whereby the aforementioned disadvantages can be avoided and the method can be carried out with relatively lightweight and compact apparatus and even without the need for mounting the workpiece for machining upon an intricate workpiece-support assembly.

A further object of this invention is to provide an improved method of machining a conductive workpiece which is not only capable of improving the finish by comparison with earlier methods but which can make use of relatively inexpensive electrode systems and can be carried out at relatively high rate.

Yet another object of this invention is to provide an improved electrode for the electrochemical machining of conductive workpieces which electrode has a relatively low rate of deterioration, can be employed at relativly high speed, and is relatively inexpensive by comparison with earlier electrode systems.

Still another object of this invention is to provide a method of making an improved electrode structure of the character described.

Yet another object of my present invention is the provision of an apparatus for the electrochemical machining of a conductive workpiece which does not require the connection of the workpiece itself in the supply circuit.

I have discovered that, when a pair of closely spaced electrode surfaces (separated by a resistive region) are juxtaposed with a conductive workpiece and an electrolyte is introduced between these surfaces and the workpiece, the application of an electric potential across the surfaces (rather than between the workpiece and the electrode) is capable of inducing an ion current in the electrolyte which erodes the workpiece opposite at least one of these surfaces. While applicant does not wish to be bound by any theory in this regard, it may be hypothesized that the high conductivity of the workpiece by comparison with the electrode structure and/or the electrolyte permits the workpiece to form a low-resistance path along the normal ion current between the electrode surfaces such that a major portion of the current flow between these surfaces involves a bypass of the total electric current flow to surface areas of the workpiece. If this is indeed the case, a portion of a workpiece surface opposite one of these electrode surfaces will have a relatively anodic character and be subject to electrolytic oxidation in the electrolyte. Thus a steel, titanium, tungsten carbide or other generally metallic workpiece appears to undergo an electrolytic and generally irreversible transformation of the metallic ions of the workpiece surface into the corresponding oxide which is then carried away by solubilization in or mechanical entrainment by the electrolyte upon the sweep of the electrode over the workpiece surface. Even if the workpiece surface zone does not itself form an electric-current bypass as indicated, it is possible that there is an induced potential at the workpiece surfaces which are juxtaposed with the electrode surfaces and that this induced potential sustains the electrolytic-erosion action. In any event, electrolytic erosion of the workpiece surface occurs as a practical matter and when consumption of power or power efficiency in terms of quantity of material eroded per unit of power consumed is concerned, the machining rate or efficiency approaches that obtainable when the electrode and the workpiece are connected across the electric supply means.

The method of the present invention thus involves the steps of juxtaposing a pair of closely spaced electrode surfaces with the workpiece, introducing an electrolyte between these surfaces and the workpiece, and applying an electric potential (preferably pulsating) across these surfaces to induce an ion current in the electrolyte and erode the workpiece opposite at least one of these surfaces. Advantageously, these electrode surfaces are provided by a unitary electrode body which is displaced with respect to the workpiece at a relatively high rate to ensure a uniformity of the machining operation. The pulsating electric potential is, moreover, periodically reversed so that the effective polarity of each electrode surface is interchanged at least once during each period whereby the machining of the workpiece opposite each electrode surface is carried out uniformly. When, in accordance with another feature of this invention, three such surfaces are closely juxtaposed, each can be energized with one phase of a three-phase alternating current with excellent results.

I have discovered that the closely-spaced electrode surfaces can be separated by a highly resistive material of relatively small and even practically molecular spacing. Advantageously, the electrode surfaces are formed respectively on a face of a unitary body composed of graphite and having grain planes extending transversely to the workpiece. This facet of the present invention is based upon my discovery that graphite can be compacted and sintered or fused into a coherent body whose grain runs parallel to the plane of the graphite crystal structure; alternatively the respective portions can be interfitted or interleaved. This discovery involves the fact that the electrical conductivity of graphite in planes parallel to its hexagonal and planar crystallographic structure is relatively high and its between one-tenth and one-thousandth of the resistivity of the graphite transversely to its crystal plane. Thus, according to another aspect of this invention, the electrode body is formed by orienting graphite particles with its platelets (crystal units) in planes perpendicular to the working face of the electrode body, then applying pressure to these particles transversely of these planes, and sintering the particles into a monolithic body. The various electrode surfaces can then be formed by rendering certain of these graphite grain planes conductive by disposing them in conductive relationship with a respective electrode terminal whereby the spacing between the electrode surfaces can have a width not significantly greater than the molecular thickness of a single graphite plane in an ideal case.

Thus, according to another aspect of the present invention, an electrode for the electrochemical machining of a conductive workpiece can comprise a monolithic body having at least two conductive portions in closely spaced relationship forming at least a pair of electrode surfaces at a machining face of this body, and at least a pair of terminals each conductively connected to one of these portions for applying an electric potential across these surfaces. The conductive portions of the electrode body are separated by an intervening portion resistive to the passage of an electric current between these conductive portions, all of the portions consisting essentially of the same material, namely, graphite. The terminals described above can be of any desired type, although it will be understood that best results are obtained when the terminals are constituted as strips applied to the graphite body and extending transversely to the grain of the graphite but remote from the working face. The terminal strips can thus be contact members embedded in the graphite body during the sintering operation or fused thereto in a subsequent operation. Alternatively, the terminal members can be applied to the graphite body by printed-circuit methods (e.g. by chemically etching or removing intervening portions) and, when a pair of terminal strips are provided, in an intertwined or spiral pattern so that a pair of substantially continuous terminal strips form a multiplicity of alternating electrode polarities across the working face. In general, the electrode surfaces at the working face will be substantially coextensive with the areas of the terminals remote therefrom. The terminals may also form slip rings or annular contact members mechanically implanted in the electrode body or fused thereto with the current distribution to the electrode, which is preferably rotatable against the workpiece surface, being effected by means of brushes or the like.

The apparatus for electrochemical machining of a conductive workpiece thus comprises, in addition to the monolithic electrode body and terminal structure described above, means for supplying an electrolyte to the working face of the electrode (e.g. by discharging a continuous stream of electrolyte at this working face), electric supply means connectable to the terminals for applying a preferably pulsating and periodically reversed electric potential to the conductive portions of the electrode body; and means for relatively displacing the electrode and the workpiece, the last-mentioned means preferably including a motor for driving the electrode at a speed between 5 and 50 meters/second at contact with the workpiece. Thus the apparatus, according to this invention, may include a tool rest or the like juxtaposed with a rotatable electrode surface and upon which the workpiece (e.g. a lathe-turning tool or the like) can be held in engagement with or urged against the electrode surface as described in my copending application Ser. No. 512,338 mentioned above. There is no need to connect the workpiece to an electric source and the present invention, therefore, also contemplates the provision of a portable apparatus designed to effect electrochemical machining of a workpiece surface in place at a region remote from any ability to mount the workpiece in a proper support as has hitherto been required for electrochemical machining operations. It will also be understood that the use of a pair of closely spaced electrode surfaces in the manner indicated precludes the undesirable development of continuous-arc discharges between the machining face of the electrode and the workpiece and thus there is no need to provide electronic means for the suppression of such discharges as has been required heretofore. Moreover, inasmuch as the graphite electrode of this invention has a specific resistivity or conductivity approaching that of the electrolyte employed in accordance with the principles initially set forth in the aforementioned copending application, there is no need to provide special means adapted to maintain a predetermined gap between the electrode and the workpiece and, in fact, best results are obtained when the workpiece is continuously urged against the electrode (or vice versa) with a pressure of substantially 0.1 to 5 kg./cm.$^2$. In fact, the electrochemical machining process results in an evolution of gases at the interface between the electrode and the workpiece, which gases (consisting essentially of the products of electrolytic decomposition of the electrolyte solution and steam) urge the workpiece away from the electrode against the inwardly applied forces to form a minute gap (generally on the order of hundredths of a millimeter). Due to the inherent irregularities of the electrode and the workpiece, actual contact is experienced from time to time without detrimental effect. The source of electric current, according to this invention, may have a frequency ranging between substantially 50 cycles/second and 10 kilocycles/second and can include a unidirectional or D.C. component. Advantageously, the specific resistivity of the electrolyte ranges between substantially 2 and 10 ohm-cm. with the electrolyte being composed of an aqueous solution of an inorganic compound (e.g. potassium nitrate, potassium nitrite, sodium nitrate, sodium nitrite, potassium carbonate, sodium carbonate, potassium silicate, sodium silicate, potassium fluosilicate, sodium phosphate, potassium chloride, sodium chloride, sodium hydroxide, potassium hydroxide, potassium acetate, sodium acetate and oxidizing inorganic acids).

The above and other objects, features and advantages of the present invention will become more readily apparent from the following description, reference being made to the accompanying drawing in which:

FIG. 1 is a somewhat diagrammatic elevational view of a portable electrochemical machining apparatus in accordance with this invention;

FIG. 2 is an end view of the terminal end of an electrode for such an apparatus;

FIG. 3 is an axial cross-sectional view through an electrode similar to that of FIG. 2;

FIG. 6 is a diagrammatic view of another type of an electrochemical machining apparatus, partially in axial cross-section;

FIG. 7 is a perspective exploded view of an electrode in accordance with this invention;

FIGS. 8 and 9 are diagrammatic views of other devices for effecting electrochemical machining of a conductive workpiece; and FIG. 10 is an exploded view of an electrode of another type suitable for use in accordance with the principles of this invention.

Figure 4:
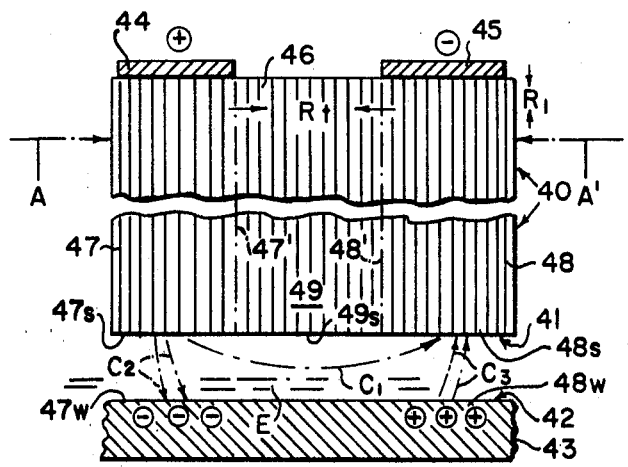
FIGS. 4 and 5 are diagrams for facilitating the explanation of the principles of this invention.

Referring first to FIG. 4, it will be seen that an electrode body 40 can be composed of sintered graphite whose crystal planes run perpendicularly to the working face 41 of the electrode, this face being shown to be spaced from the surface 42 of a workpiece 43 to be machined. The resistance $R_t$ of the electrode body 40 transverse to its crystal planes can be six or more times greater than the resistance $R_1$ longitudinally along the planes or grain. Terminal strips 44 and 45 can be applied to the surface 46 of the electrode body 40 remote from the working face 41, by printed-circuit methods as described earlier. Thus, for example, a layer of copper, silver, their alloys, or another highly conductive metal may be printed onto this surface 46 in strip form as metallic bands and thereafter fused to the graphite body or, alternatively, a metallic layer may be fused or pressed onto this body and the individual strips 44, 45 (which extend perpendicularly to the crystal planes of the graphite) formed by etching or otherwise solubilizing intervening zones. Inasmuch as the conductivity of the graphite along its crystal planes is many times greater than its conductivity transversely thereto, the terminals 44 and 45 form in the monolithic body 40, respective conductive portions 47 and 48, here shown diagrammatically to be bounded by dot-dash lines 47', 48'. Between the conductive portions 47 and 48 (i.e. between dot-dash lines 47' and 48') there is an intervening portion 49 which is integral therewith (i.e. monolithically formed from the body 40) but serves to insulate the conductive portions 47 and 48 from one another. While the thickness of this intervening portion 49 has been enlarged for purposes of illustration in FIG. 4, it will be understood that in practice a single graphite crystal plane may form the resistaive shield between the conductive portions because of the significantly greater resistance across such a plane by comparison with resistance parallel thereto. The body 40 is produced by compressing the oriented laminar mass of graphite particles transversely to their respective planes as represented at arrows A, A' with subsequent sintering of the body as described in my copending application Ser. No. 512,338. Thus the graphite flakes can be compressed in a mold shaped in accordance with the desired contours of the electrode at a pressure of $5 \times 10^3$ kg./cm.$^2$ in the direction of arrows A, A', i.e. transversely to the grain and perpendicularly to the planes of the platelets. Thereafter, the electrode can be sintered at a temperature between 1000° and 1700° C. with best results being obtained at a temperature of about 1200° C.

Each of the conductive portions 47 and 48 defines at the working face 41 of the electrode body 40, respective electrode or machining surfaces 47s and 48s which are juxtaposed with surface regions 47w and 48w of the workpiece face 42 and are, in FIG. 4, shown to be spaced therefrom although best result are obtained when the electrode and workpiece are urged together with only the gases generated in situ preventing actual engagement. The surface zone 49s between the electrode surfaces 47s and 48s is substantially nonconductive since it is not associated with a terminal. An electrolyte E fills the space between the electrode 40 and the workpiece 43 and is adapted to sustain an ion current. Thus when an electric potential is applied to the terminals 44 and 45, the electrode surfaces 47s and 48s are of corresponding polarity and an ion current (hereinafter referred to as a non-load component) passes between the conductive portions 47 and 48 as represented by the dot-dash line $C_1$. Another portion of the current, constituting the axial machining component, appears to flow as diagrammatically illustrated by dot-dash lines $C_2$ and $C_3$ between the juxtaposed surfaces 47s, 47w, and 48s, 48w of the electrode and workpiece, an equivalent electric current flowing through the workpiece body 43 between the surfaces 47w and 48w. Moreover, surface 47w appears to develop a negative charge when its electrode face 47s is relatively positive whereas surface 48w can be considered as having a positive potential with respect to the surface 48s of the electrode.

In a practically irreversible manner, anodization of the workpiece material occurs at surface 48w with the metal oxides being swept away by the electrolyte stream passing along this surface as a consequence of a corresponding displacement of the electrode 40 with respect to the workpiece 43 and/or high-velocity injection of the electrolyte between the electrode and the workpiece. It appears that optimum machining results can be obtained when the current flow ($C_1$), between the electrode surfaces through the electrolyte only, is relatively small by comparison with the current flow ($C_2$, $C_3$) which passes in part through the workpiece. Thus, the resistance of the electrolyte between the surfaces 47s and 48s and the corresponding surfaces 47w and 48w should, when taken with the resistance of the workpiece 43 between the surfaces 47w and 48w, be substantially less than the electrolyte resistance between the surfaces 47s and 48s. Moreover, the resistance of the intermediate portion 49 should be substantially greater than this latter electrolyte resistance. It will be understood that generally the polarity at the electrode surfaces 47s, 48s continuously reverses so that anodization takes place alternately at the surfaces 47w and 48w, thereby ensuring a uniform machining of the workpiece 43 as the electrode body 40 sweeps thereacross.

Figure 5:
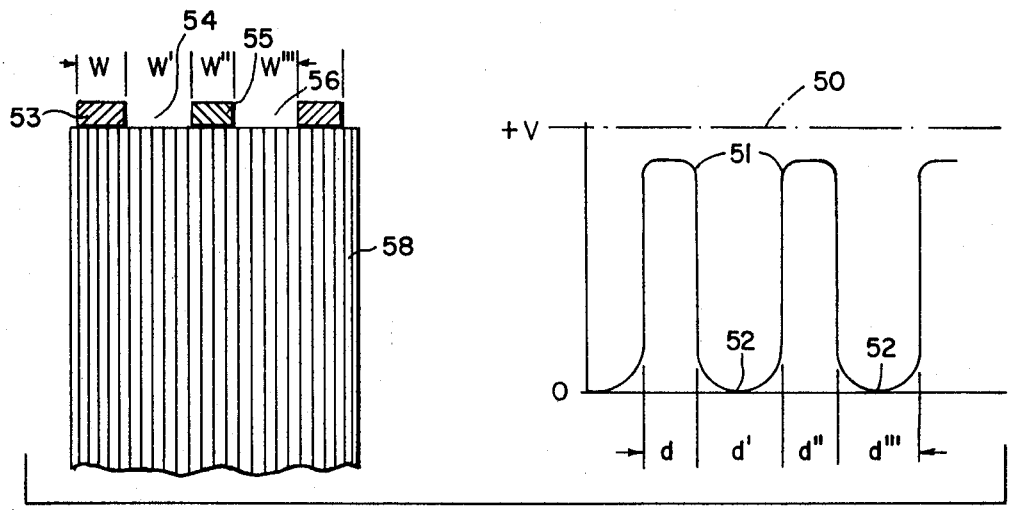

In FIG. 5, I show a diagrammatic graph of the potential at surfaces of the electrode corresponding to the electrode surfaces 47s and 48s as well as the polarity observed at the workpiece surfaces 47w and 48w, respectively. In this illustrated system, it is assumed that the amplitude of the applieda voltage V is represented by the dot-dash line 50. Inasmuch as the graphite conductive portions of the electrode have finite albeit small resistivities, the maximum voltage delivered at the electrode faces during each half cycle or "pulse" can be represented by the peak heights 51 at the conductive surfaces 47s and 48s. Across the electrode, however, these conductive surfaces are spaced apart by nonconductive portions at which the potential falls sharply to form the troughs 52. The thicknesses $d$, $d'$, $d''$ and $d'''$, respectively, are identical with the widths $w$, $w'$, $w''$ and $w'''$ of the initial terminal strip 53, the gap 54, a further terminal strip 55 and the subsequent gap 56 of the electrode body 58, respectively. It will be understood that the conductive strips forming terminal zones of the body and defining the conductive portions and electrode surfaces, which are substantially coextensive with these terminal strips, can have any desired configuration, although it is preferred to provide strips 44, 45; 53, 55, etc. with annular portions engageable by slip rings so that the electrode can be rotated for a machining operation.

In FIG. 1, therefore, I show a tubular graphite electrode 10 of the general character described wherein the terminal strips can be generally spiroidal as illustrated in greater detail with reference to FIGS. 2 and 3. The tubular electrode body 10 whose grain runs parallel to the axis of the body in this instance, is mounted upon a shaft 14 which, in turn, is rotatably driven by a motor 17 carried on a portable support 18 and having a handle 19 whereby the machinist can support the motor 17 and the electrode 10 in contact with a workpiece 20. It will be evident that the apparatus illustrated in FIG. 1 can be carried directly to the workpiece inasmuch as there is no need either to mount this workpiece for predetermined location with respect to the electrode or to connect the workpiece in the supply circuit. In this case, the supply circuit is represented at 11 diagrammatically and is shown to have brushes 12 and 13 adapted to deliver the alternating electric current to the two sets of electrode surfaces of the body 10. An electrolyte is here delivered to the interface between the electrode and the workpiece by means of a fitting 16 connectable to a conventional electrolyte-circulation pump or the like and communicating with a central bore 15 running along the interior of the electrode. While machining is here shown to occur at the end face of the electrode 10, it will also be understood that the cylindrical surfaces of this electrode can likewise be used for machining with suitable modification to form the closely spaced electrode surfaces (see FIG. 10). With the aid of handle 19, the assembly 18 etc. can be displaced back and forth to form a relatively large cavity in the workpiece 20 and to surface the latter or, alternatively, the assembly may even be maintained in place so that under the weight of the motor 17 and the housing or support structure 18, the electrode can descend to sink a smaller cavity in the workpiece. Moreover, the mass of the assembly may be selected so that, without the need for the application of additional pressure, a force corresponding to the desired pressure of substantially 0.1 to 5 kg./cm.$^2$ is sustained at the interface.

In FIG. 2, I illustrate a modified electrode structure in which the graphite body is mounted upon a shaft 26 provided with a central bore 27 for delivery of electrolyte to the machining face and is provided at its end remote from the working face with terminal strips 23 and 24 of intertwined and spiroidal configuration by the etching or printed-circuit methods described above. The spiroidal strips 23 and 24, here shown as two partial and widely spaced turns, can be relatively narrow and multiturned current-delivery networks whose spacing may be of a fraction of a millimeter or of the order of millimeters. The spiroidal space between the strips 23 and 24 is illustrated at 21; each of these strips is shown to be integral with or in electrical connection with a respective annulus 22, 25 of the same or similar metal. The annuluses 22 and 25 thus serve as slip rings whereby current can be delivered from a source (e.g. as represented at 11) to the electrode via suitable brushes. It will be understood that the term "brushes" as used herein is intended to designate current-delivery elements of the type making slidable or rolling contact with a slip ring in electromechanical devices of conventional types. Such brushes may, therefore, be carbon blocks, rods or rotatable elements; alternatively actual filament-type brush structures may be employed for this purpose. In the case of the electrode illustrated in FIGS. 2 and 3, the brushes apply themselves to the slip rings 22 and 25 in a generally axial direction as represented by the arrows 25 which represent brushes supplied with electric current from the alternating-source 34. The brushes 35 thus engage slip rings 33 and 32 along the inner and outer boundaries of the tubular electrode body 30. As has been previously described with reference to FIG. 4, the terminals 33 and 32 respectively define electrode surfaces 36 and 38 at the working face 31 of the electrode body, these surfaces being separated by a nonconductive region 37. In the embodiments of FIGS. 2 and 3, the electrode body is rotated and the spiroidally intertwined electrode surfaces sweep alternately over every point within the axially projected outlines of the electrode body.

In the arrangement illustrated in FIG. 6, however, the closely spaced electrode surfaces 60a, 60b and 60c of the cylindrical disk-shaped electrode body 60 can be defined by generally annular disk-shaped graphite elements sintered axially into coherency or merely applied together, the graphite platelets lying generally in crystal planes perpendicular to the axis of rotation of the body 60. Current distribution to the respective portion 60a, 60b and 60c can be effected by rings embedded into the graphite bodies along their inner peripheries and electrically connected, respectively, to bus bars 61a, 61b and 61c, extending through a support tube 62 of an electrically insulating material. The electrode body 60 is mounted upon the tubular support 62 which also carries slip rings 63a, 63b and 63c respectively connected to the bus bars 61a, 61b and 61c for delivering the machining current to the electrode surfaces 60a, 60b and 60c. The tube 62 is rotatably journaled in a support 64 which can be shifted parallel to the workpiece 65 to sweep the electrode 60 thereacross or can be mounted in place at any desired location. A nozzle 66 delivers a stream of electrolyte between the electrode body 60 and the workpiece 65, the latter being held in place by hand or mounted upon a longitudinal or cross-slide in the manner of a surface grinder. Current delivery to the slip rings 63a, 63b and 63c is effected by means of spring-loaded brushes 67a, 67b and 67c each of which is supplied with electric current from one phase terminal of a Y-type 3-phase transformer 68. The primary winding 68p of this transformer is energized by conventional 3-phase supply current. Between each terminal of the secondary winding 68s of the transformer and the respective brush 67a, 67b and 67c, I provide a saturable reactor control means (represented at 69) for regulating the supply power. The saturable reactor means includes a plurality of saturable reactors 69a, 69b and 69c, each connected in series with the respective brush 67a, 67b and 67c, whose control windings are tied in series with a D.C. biasing battery 69d and a manually adjustable variable resistor 69e. Thus, each electrode surface 60a, 60b and 60c of the electrode body 60 will be energized 120° out of phase with the others whereby one or another of these surfaces will be relatively anodic and the other or others relatively cathodic. Opposite the relatively cathodic surface or surfaces, anodization of the workpiece occurs and, inasmuch as the electric supply is an alternating current, the anodization operation is effectively carried out opposite each of the electrode surfaces 60a, 60b, 60c and across the face of the electrode, in a progressive manner. The electrode body 60 is rotated via a motor 62m coupled with the support tube 62.

In the system of FIG. 7, a pair of electrode disks 70 and 71 are axially joined together via pin-and-bore formations 72', 72" and have respective slip rings 73 and 74 for current distribution by means of brushes in the manner previously described. Each of the disk-shaped electrode bodies 70 is composed of a plurality of radial layers of graphite whose crystal planes run in axial planes along radii of the body and are alternately supplied with electric current from respective distribution rings 75 and 76 which simultaneously insulate the metal sectors conductively connected to alternate graphite layers from one another. The terminals 75 and 76 are connected with the slip rings 73 and 74 via conductors diagrammatically represented at 77 and 78. It will be understood that the disks 70 and 71 are assembled in angularly offset relationship so that the "conductive portion" of 1 disk abuts against the nonconductive portion of the other disk and an alternating current is applied to the slip rings 73 and 74 to effect electrochemical machining of the workpiece across the proximal electrode surfaces of the two disks immersed in the electrolyte in the region of the workpiece. In the system of FIG. 8, the electrode comprises a plurality of graphite members 80a, 80b and 80c which are longitudinally shiftable in a support carriage 81 by automatic or manual reciprocation means. The secondary winding 82s of a three-phase Y transformer (not otherwise shown) has its terminals connected to the electrode 80a, 80b and 80c respectively.

In this case, the electrodes 80a, 80b and 80c are shown to be relatively widely spaced merely for purposes of descrpition and it will be understood that best results are obtained when these electrodes are brought together as illustrated in FIG. 9. The electrode bodies 80a, 80b and 80c are composed of carbon whose graphite platelets lie in planes perpendicular to the plane of a paper and thus parallel to the axis of rotation of the workpiece here shown as a disk 83. This disk, which is faced by the electrodes 80a, 80b and 80c, is mounted upon a shaft 84 and rotated about its axis by drive means not otherwise illustrated. A saturable reactor control means can be provided between the secondary winding 82s of the three-phase transformer and the electrodes 80a, 80b and 80c as diagrammatically illustrated at 85 and shown in greater detail at 69 in FIG. 6. Electrolyte is discharged from a nozzle 86 between the electrodes 80a, 80b, 80c and the workpiece 83.

In the modification of FIG. 9, the workpiece 93 is again rotated about its axis on a shaft 94 and is juxtaposed with six closely adjoining electrode portions 90a–90f forming a unitary body shiftable parallel to the face of the disk 93 by a carriage 91. In this case, the polyphase alternating current source includes a Y-wound network 92, each of whose branches is respectively constituted as one branch of the further three-phase networks 92', 92" and 92'''. The six output terminals of these further three-phase branches, which together constitute a six-phase system, result in a symmetrical output of six-phases each 60° out of phase with the adjustment phases.

The electrode of FIG. 10 represents a modified structure adapted to be used along its cylindrical outer periphery or its transverse face. This electrode comprises a star-shaped outer member 100 which is interleaved with the protuberances 101 of a complementary inner member 102. The latter is mounted upon a tube 103 which carries a pair of slip rings 104, 105, the latter being mounted upon an inner tube member 106 insulatingly received within the tube 103 and connected directly to the central portion 108 of the outer members. Both members are composed of graphite and are bonded together, as is set forth below in connection with Example I, the bonding agent forming an insulating layer between the sections. An electrolyte can be directed against the face of the electrode body at which the projections 101 and the star-shaped formations 109 are coterminous by means of a nozzle 110.

Example I

Using a rotating electrode consisting of two 12-section star-shaped electrode bodies of the type illustrated in FIG. 10 of the drawing, and fused together into a unitary electrode structure so that 24 electrode sections or surfaces were angularly offset about the axis of rotation of the electrode, which had a diameter of approximately 15 cm., a potential of 10 volts was applied between the adjacent sections at 50 cycles/second via slip rings as illustrated in FIG. 10. The no-load current with an electrolyte spray across the working face was approximately 8 amperes and the electrolyte was an aqueous solution of 10% by weight potassium nitrate and 5% by weight potassium carbonate. With a tungsten carbide workpiece the total current determined when the workpiece was juxtaposed with the electrode was 88 amperes, thereby indicating that the machining current flow was approximately 80 amperes. The workpiece was machined at a rate of approximately 0.75 gram/minute over a machining area of approximately 1.2 cm.$^2$ and with an applied force of about 2.2 kg. urging the workpiece against the rotating electrode. An electrolyte flow rate sufficient to keep the interface in a constant spray of electrolyte was employed at room temperature. The finish was found to be comparable to that obtained when the tungsten-carbide workpiece was connected in the supply circuit. The same results were obtained when the electrode bodies were bounded together with an electrically insulating epoxy resin (Araldite).

Example II

Using a generally cylindrical electrode of the type illustrated in FIGS. 2 and 3 and composed of homogeneous graphite particles with axially extending crystal planes, an axial length of 5 mm., a pair of spiroidally intertwined terminals having a width of 2 mm. with a gap of 5 mm. between the adjecent turns and printed onto the disk-shaped electrode by copper-printing techniques used in printed circuitry, the resistance of the electrode was determined to be $2 \times 10^{-3}$ ohm-cm. along the axis and about $8.5 \times 10^{-3}$ ohm-cm. in the radial direction. The electrode had a diameter of approximately 20 cm. and was rotated with a peripheral speed of 50 m./second and the workpiece applied thereagainst with a pressure of 1.5 kg./cm.$^2$ at the end of the electrode remote from the terminals. The electrolyte was an aqueous solution containing 3% by weight sodium nitrate and 2% by weight sodium nitrite, while the workpiece structure was tungsten carbide. Machining was effected with the use of a single-phase alternating current (10 volts peak-to-peak) at 50 cycles/second. The system was capable of sinking a cavity into the tungsten carbide workpiece at a rate of about 0.6 mm./min.

The invention described and illustrated is believed to admit of many modifications within the ability of persons skilled in the art, all such modifications being considered within the spirit and scope of the appended claims.

I claim:
1. A method of electrochemically machining a conductive workpiece, comprising the steps of:
   (a) forming a pair of closely spaced electrode surfaces with an intervening insulating barrier surface on a face of a unitary body integrally composed of graphite by providing said body with grain planes associated with each of said surfaces extending transversely to said face whereby said grain planes of said electrode surfaces sandwich said grain plane of said insulating barrier surface between them, all of said grain planes being substantially similar in composition and having greater electrical conductivity in the direction of the planes than transversely thereto;
   (b) juxtaposing said face with said workpiece whereby said electrode surfaces are spaced apart therealong by said insulating barrier surface;
   (c) introducing an electrolyte between said electrode surfaces and said workpiece;
   (d) applying an electric potential across said electrode surfaces by connecting an electrical source across the grain planes thereof remote from said face to induce an ion current in said electrolyte and erode said workpiece opposite at least one of said electrode surfaces; and
   (e) relatively displacing said face and said workpiece during the erosion of said workpiece.

2. The method defined in claim 1 wherein said body is rotated in step (e).

3. The method defined in claim 2 wherein said electrode surfaces have a specific resistivity between substantially 0.001 and 10 ohm-cm., said method further comprising the step:
   (f) of urging said electrode surfaces and said workpiece together with a pressure ranging between substantially 0.1 and 5 kg./cm.² whereby only gas evolution in situ prevents actual engagement of said surfaces with said workpiece.

4. The method defined in claim 3 wherein said electrolyte is introduced in step (b) between said electrode surfaces and said workpiece by directing a stream of said electrolyte against said electrode surfaces.

5. The method defined in claim 3 wherein said body is formed by orienting graphite particles with platelets in planes perpendicular to said face, applying pressure to said particles transversely to said planes, and sintering said particles into a monolithic body.

6. The method defined in claim 3 wherein said electric potential is a pulsating electric field.

7. The method defined in claim 6 further comprising the step of periodically reversing the electric field applied across said electrode surfaces at a rate of substantially 50 and 10,000 cycles per second.

8. An apparatus for the electrochemical machining of a conductive workpiece, comprising:
   an electrode formed with a body having at least two conductive portions in closely spaced relationship and constituting a pair of electrode surfaces at a machining face of said body, and a pair of terminals each conductively connected to one of said portions;
   means for applying an electrolyte to said face for interposition between said workpiece and said surfaces; and
   electric means connectable to said terminals for applying an electric potential to said conductive portions, thereby to induce an ion current in said electrolyte and erode said workpiece opposite at least one of said surfaces, said body being composed of graphite with the grain of the graphite running longitudinally along said portions perpendicular to said surfaces.

9. An apparatus as defined in claim 8, further comprising support means; means for journaling said body on said support means for rotation about an axis of said body, said terminals including sliprings connected with said body for the application of said electric potential thereto, said electric means including brush means engageable with said sliprings; and motor means for driving said body.

10. An apparatus as defined in claim 9 wherein said electric means includes a polyphase source of alternating current connected across said electrode surfaces.

11. An apparatus as defined in claim 8 wherein said terminals are metallic strips printed onto said electrode body.

References Cited
UNITED STATES PATENTS

| | | | |
|---|---|---|---|
| 2,526,423 | 10/1950 | Rudoroff | 204—143 |
| 2,746,917 | 5/1956 | Comstock | 204—143 |
| 2,974,215 | 3/1961 | Inoue | 219—68 |
| 3,214,361 | 10/1965 | Williams | 204—224 |

ROBERT K. MIHALEK, Primary Examiner

U.S. Cl. X.R.

204—212, 224, 294; 219—68